Nov. 2, 1926.  
P. HERMES  
1,605,726  
HEADLIGHT SHIFTING MECHANISM FOR MOTOR VEHICLES  
Filed Sept. 29, 1925
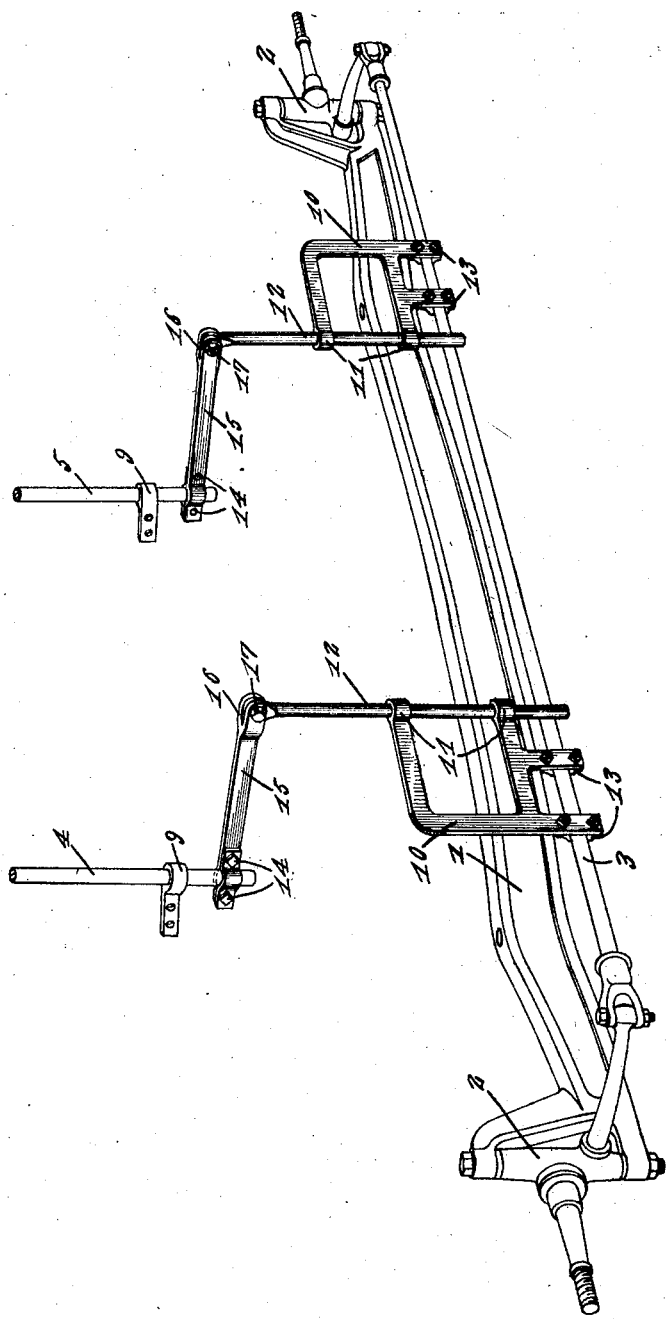
INVENTOR.  
*Peter Hermes,*  
BY  
*Geo. T. Kimmel* ATTORNEY.

Patented Nov. 2, 1926.

1,605,726

UNITED STATES PATENT OFFICE.

PETER HERMES, OF BROWERVILLE, MINNESOTA.

HEADLIGHT-SHIFTING MECHANISM FOR MOTOR VEHICLES.

Application filed September 29, 1925. Serial No. 59,295.

This invention relates to a headlight shifting mechanism for motor vehicles, and has for its object to provide, in a manner as hereinafter set forth, a mechanism of the class referred to, for automatically adjusting the headlights to the direction in which the vehicle is travelling, whether around curves or corners, so that the light rays will follow the wheels and be projected directly ahead of the vehicle and in the same direction in which the vehicle is travelling.

Further objects of the invention are to provide a headlight shifting mechanism, in a manner as hereinafter set forth, and for the purpose referred to, which is simple in its construction and arrangement, strong, durable, compact, readily installed, thoroughly efficient in its use, capable of having certain of the elements thereof to vertically move one with respect to the other to compensate for the elevating and lowering of the front axle of the vehicle, and comparatively inexpensive to manufacture.

With the foregoing and other objects in view, the invention consists of the novel construction, combination and arrangement of parts, as hereinafter more specifically described and illustrated in the accompanying drawing, wherein is shown an embodiment of the invention, but it is to be understood that changes, variations and modifications can be resorted to which come within the scope of the claims hereunto appended.

The drawing illustrates in perspective a headlight shifting mechanism, in accordance with this invention, and showing the adaptation thereof with respect to the headlight posts, front axle and steering mechanism of the vehicle.

Referring to the drawings in detail, 1 denotes the front axle of a vehicle, 2 the steering knuckle devices, and 3 the connecting rod between the said devices to provide for the simultaneous operation of said devices.

A headlight shifting mechanism, in accordance with this invention, is interposed between the headlight posts 4, 5 and the connecting rod 3, as well as being connected to the said posts and the said rod, so that when the rod 3 is shifted the mechanism will be operated to simultaneously adjust the posts to a position whereby the light rays will follow the front wheels of the vehicle.

Holding brackets 9 are provided for the posts 4, 5 and are fixedly secured by holdfast devices to the body of the vehicle.

The mechanism includes a pair of shifting devices, one for each lamp, and as each of said devices is of the same construction, but one will be described, as the description of one will apply to the other. Each of said devices is arranged at one side of the rod 3 and consists of a vertically disposed coupling bracket formed of a vertically disposed arm 10 having integral therewith an upper and a lower right angularly disposed arm 10', 10" respectively which extend from the inner side thereof. The arm 10' is positioned at the top and the arm 10" adjacent the bottom of the arm 10. The arm 10', as well as the arm 10" has its free end provided with a collar constituting a bearing 11. The arm 10", intermediate its ends, is formed with a depending integral extension 10'. Extending through the bearings 11 of each coupling bracket is a vertically slidable operating bar 12 of materially greater length than the height of the coupling bracket whereby said bar will extend above and depend below the bracket. The lower end of the arm 10 and the extension 11' of each coupling bracket is fixedly clamped, as at 13, to the connecting rod 3 so that the coupling brackets and operating bars will be bodily carried with the connecting rod 3 during the shift thereof.

Fixedly secured to each post, near the lower end thereof, as at 14, is an actuating arm 15 therefor, and the said arm has its outer end provided with a yoke 16 into which extends the upper end of the bar 12. The upper end of the bar 12 is pivotally connected to the yoke 16, as at 17. The bar 12 slides in the bearings 11, or in other words the bar 12 and its associated coupling bracket can vertically shift relatively to each other, so that the mechanism will not be impaired when the front axle moves upwardly or downwardly.

When the connecting rod 3 is shifted in either direction, due to the operation of the steering mechanism of the vehicle, the coupling brackets carry the bars 12 therewith, whereby the arms 15 are actuated, which in turn will adjust the position of the posts 4 and 5, so that the headlights, not shown, carried by said posts will be adjusted to position the light rays to follow the front wheels of the vehicle, and said rays will be projected ahead of and in the same direction as the vehicle is travelling.

It is thought that the many advantages of a headlight shifting or adjusting mechanism, in accordance with this invention, can be readily understood, and although the preferred ebodiment of the invention is as illustrated and described, yet it is to be understood that changes in the details of construction can be had which will fall within the scope of the invention as claimed.

What I claim is:—

1. In a headlight shifting mechanism, a pair of headlight carrying posts, a pair of spaced, aligning vertically extending, oppositely disposed coupling brackets each including a pair of superposed spaced bearings at one side thereof, means for clamping said brackets to the connecting rod of a steering mechanism to provide for the bodily shifting of the brackets in unison with such rod, a vertically movable operating bar slidably mounted directly in the bearings of and of materially greater length than the height of each of said brackets, each rod extending above and below its respective bracket, a rearwardly extending actuating arm for each of said posts, means for fixedly clamping the forward end of an arm to its respective post, and means for pivotally connecting the rear end of each arm to the upper end of an operating bar.

2. In a headlight shifting mechanism, a pair of headlight carrying posts, a pair of spaced aligning vertically extending, oppositely disposed coupling brackets each including a vertical and a pair of parallel spaced arms disposed at right angles to and integral with the inner side of the vertical arm and each provided at its free end with means to provide a bearing, means for clamping the vertical and lower right angularly disposed arm of each of said brackets to the connecting rod of a steering mechanism to provide for the bodily shifting of the brackets with such rod, said brackets positioned rearwardly with respect to such rod, a vertically disposed operating bar slidably mounted directly in the bearings of and of materially greater length than the length of each of said brackets and extending above and below the same, a rearwardly extending actuating arm for each of said posts, means for fixedly clamping the forward end of each arm to its respective post, and means for pivotally connecting the rear end of each arm to the upper end of an operating bar.

3. In a headlight shifting mechanism, a pair of headlight posts, a pair of spaced, aligning, vertically extending, oppositely disposed coupling brackets each including a pair of superposed spaced bearings positioned at the inner side thereof, means for clamping the lower end of each of said brackets, below the bearings thereof to the connecting rod of a steering mechanism to provide for the bodily shifting in unison of the brackets with such rod, a vertically removable operating bar slidably mounted directly in the bearing of each bracket and of materially greater length than the height of its respective bracket and further extending above and below the latter, a rearwardly extending actuating arm for each post, means for clamping the forward end of each of said arms to its respective post, and means for pivotally connecting the rear end of each arm to said operating bar above the bearing for the latter.

In testimony whereof, I affix my signature hereto.

PETER HERMES.